US008504185B2

(12) United States Patent
Kristjansson et al.

(10) Patent No.: US 8,504,185 B2
(45) Date of Patent: Aug. 6, 2013

(54) PREDICTIVE PRE-RECORDING OF AUDIO FOR VOICE INPUT

(75) Inventors: Trausti Kristjansson, Mountain View, CA (US); Matthew I. Lloyd, Cambridge, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/563,504

(22) Filed: Jul. 31, 2012

(65) Prior Publication Data

US 2012/0296655 A1    Nov. 22, 2012

Related U.S. Application Data

(63) Continuation of application No. 12/732,827, filed on Mar. 26, 2010, now Pat. No. 8,428,759.

(51) Int. Cl.
*G06F 17/00* (2006.01)
*G10L 21/00* (2006.01)
*H04M 3/42* (2006.01)
*G01P 15/00* (2006.01)

(52) U.S. Cl.
USPC ........... 700/94; 704/275; 455/414.2; 702/150

(58) Field of Classification Search
USPC .................. 700/29–30, 47, 52, 94; 704/275; 702/141, 150; 455/414.2–414.4
See application file for complete search history.

(56) References Cited

U.S. PATENT DOCUMENTS

| 5,657,422 | A | 8/1997 | Janiszewski et al. |
| 6,549,792 | B1* | 4/2003 | Cannon et al. ............. 455/550.1 |
| 6,615,170 | B1 | 9/2003 | Liu et al. |
| 6,813,491 | B1 | 11/2004 | McKinney |
| 2003/0103091 | A1 | 6/2003 | Wong et al. |
| 2004/0243257 | A1 | 12/2004 | Theimer |
| 2006/0052109 | A1 | 3/2006 | Ashman, Jr. et al. |
| 2007/0298751 | A1* | 12/2007 | Wulff .......................... 455/343.1 |
| 2009/0132197 | A1 | 5/2009 | Rubin et al. |
| 2010/0031143 | A1 | 2/2010 | Rao et al. |
| 2010/0069123 | A1 | 3/2010 | Araradian et al. |
| 2010/0121636 | A1* | 5/2010 | Burke et al. .................. 704/275 |

FOREIGN PATENT DOCUMENTS

| EP | 1662481 | 5/2006 |
| EP | 1063837 | 12/2010 |
| JP | 2007280219 | 10/2007 |
| WO | 2007149731 | 12/2007 |

OTHER PUBLICATIONS

Urlichs, Authorized Officer (EPO), International Search Report from related PCT Application No. PCT/US2011/029009, dated Jul. 11, 2011.
Invitation to Pay Additional Fees and, Where Applicable, Protest Fee, PCT/US2009/063874, mailed Feb. 24, 2010, 26 pages.
Dupont et al. "Assessing Local Noise Level Estimation Methods" *Workshop on Robust Methods for Speech Recognition in Adverse Conditions* (Nokia, COST249, IEEE), pp. 115-118, Tampere, Finland, May 1999.
Hirsch et al. "Noise estimation techniques for robust speech recognition" *Proc. IEE Internat. Conf. Audio*, 12(1), 1995, 153-156.
Ris et al. "Assessing Local Noise Level Estimation Methods: Application to Noise Robust ASR". *Speech Communication*, 34 (2001) 141-158.
Weiss et al. "DySANA: Dynamic Speech and Noise Adaptation for Voice Activity Detection". *ICASSP* 2008, 1-4.

* cited by examiner

*Primary Examiner* — Jesse Elbin
(74) *Attorney, Agent, or Firm* — Fish & Richardson P.C.

(57) ABSTRACT

Methods, systems, and apparatus, including computer programs encoded on a computer storage medium, for providing predictive pre-recording of audio for voice input. In one aspect, a method includes obtaining sensor data from one or more sensors of a mobile device while the mobile device is operating in an inactive state, determining that a user of the mobile device is interacting with the mobile device based on the sensor data, invoking voice input functionality of the mobile device in response to determining that the user of the mobile device is interacting with the mobile device, detecting a voice input, and activating the mobile device in response to detecting the voice input.

17 Claims, 3 Drawing Sheets

PREDICTIVE PRE-RECORDING OF AUDIO FOR VOICE INPUT

CROSS-REFERENCE TO RELATED APPLICATIONS

This application is a continuation of U.S. application Ser. No. 12/732,827, filed on Mar. 26, 2010, entitled "Predictive Pre-Recording of Audio for Voice Input," the entire contents of which are hereby incorporated by reference.

BACKGROUND

This specification generally relates to search engines.

As the amount of information available on the Internet has dramatically expanded, users have had an increasingly difficult time formulating effective search queries for locating specific, relevant information. In recent years, competition among search engine providers has caused an explosive acceleration in the evolution of search engine algorithms, as well as in the user interfaces that are used to receive queries and display search results.

Various mechanisms can be used to provide queries to a search engine. For example, a user may type a query term into a search box using a keyboard on a computing device, and may then submit the query terms to a search engine. A user may implicitly define a query by panning around a map in order to obtain annotations for points of interest that exist on the displayed portion of the map. In addition, users may speak query terms into a microphone when using mobile devices (e.g., smartphones, music players, or tablet computers) that have small or virtual keyboards.

SUMMARY

In general, one innovative aspect of the subject matter described in this specification may be embodied in methods that include the action of initiating a background recording on a mobile device when it is predicted that a user is likely to initiate voice input, even if the mobile device is locked or in a sleep mode. By initiating a background recording when a user is predicted to be likely to initiate voice input, instead of waiting until the user actually initiates the voice input, front truncation of the voice input is avoided and speech recognition accuracy is improved. Furthermore, predictive pre-recording saves the battery life of a mobile device and allows pre-input audio to be captured without the use of a continuous recording buffer.

In general, another innovative aspect of the subject matter described in this specification may be embodied in methods that include the actions of establishing, as input data, state data that references a state of a mobile device and sensor data that is sensed by one or more sensors of the mobile device, applying a rule or a probabilistic model to the input data, inferring, based on applying the rule or the probabilistic model to the input data, that a user of the mobile device is likely to initiate voice input, and invoking one or more functionalities of the mobile device in response to inferring that the user is likely to initiate voice input.

Other embodiments of this aspect include corresponding systems, apparatus, and computer programs, configured to perform the actions of the methods, encoded on computer storage devices.

These and other embodiments may each optionally include one or more of the following features. For instance, invoking one or more functionalities of the mobile device may further include commencing a background audio recording; the state data may include data that references whether a display of the mobile device is turned on or turned off, data that references whether the mobile device is operating in a locked mode or in an unlocked mode, data that references one or more applications that are executing on the mobile device, data that references whether a voice search application is executing on the mobile device, data that references whether a field selected by the user is enabled for voice text entry, or data that references whether the user is operating an input mechanism of the mobile device; the state data may include data that references a current state or a recent state of the mobile device; the sensor data may include data that is sensed by a keypad sensor of the mobile device, data that is sensed by a position determination sensor of the mobile device, data that is sensed by an accelerometer of the mobile device, data that is sensed by a magnetometer of the mobile device, data that is sensed by a light sensor of the mobile device, data that is sensed by a proximity sensor of the mobile device, data that is sensed by a capacitive sensor of the mobile device, or data that is sensed by a touch sensor of the mobile device; the actions may include establishing, as input data, sensor data may include establishing, as the input data, data that is sensed by a first sensor of the mobile device, and invoking one or more functionalities of the mobile device may include activating a second sensor of the mobile device in response to inferring that the user is likely to initiate voice input; the actions may also include establishing, as additional input data, state data, data that is sensed by the first sensor of the mobile device, and data that is sensed by the second sensor of the mobile device, applying an additional rule or an additional probabilistic model to the additional input data, inferring, based on applying the additional rule or the additional probabilistic model to the additional input data, that the user remains likely to initiate voice input, and commencing a background recording in response to inferring that the user remains likely to initiate voice input; applying the rule or the probabilistic model to the input data may include determining a score associated with the input data, and inferring that the user is likely to initiate voice input may include determining that the score associated with the input data satisfies a predefined threshold; applying a rule or a probabilistic model to the input data may include applying a rule to the input data; applying a rule or a probabilistic model to the input data may include applying a probabilistic model to the input data; the actions may include inferring, based on applying the rule or the probabilistic model to the input data, that it is unclear whether the user is likely to initiate voice input, instructing the mobile device to collect additional state data or additional sensor data in response to inferring that it is unclear whether the user is likely to initiate voice input, and applying the rule or the probabilistic model to the input data and the additional state data or the additional sensor data, where inferring that the user is likely to initiate voice input is further based on applying the rule or the probabilistic model to the input data and the additional state data or the additional sensor data; the actions may include generating the rule or training the probabilistic model using historical state data or historical sensor data; inferring that the user is likely to initiate voice input further may include inferring, by the mobile device, that the user is likely to initiate voice input; inferring that the user is likely to initiate voice input may include inferring, by a server, that the user is likely to initiate voice input; and/or the actions may include communicating an audio signal and duration data between the mobile device and the server, where the duration data indicates a duration of a background audio recording encoded in the audio signal that is recorded before the user begins speaking.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
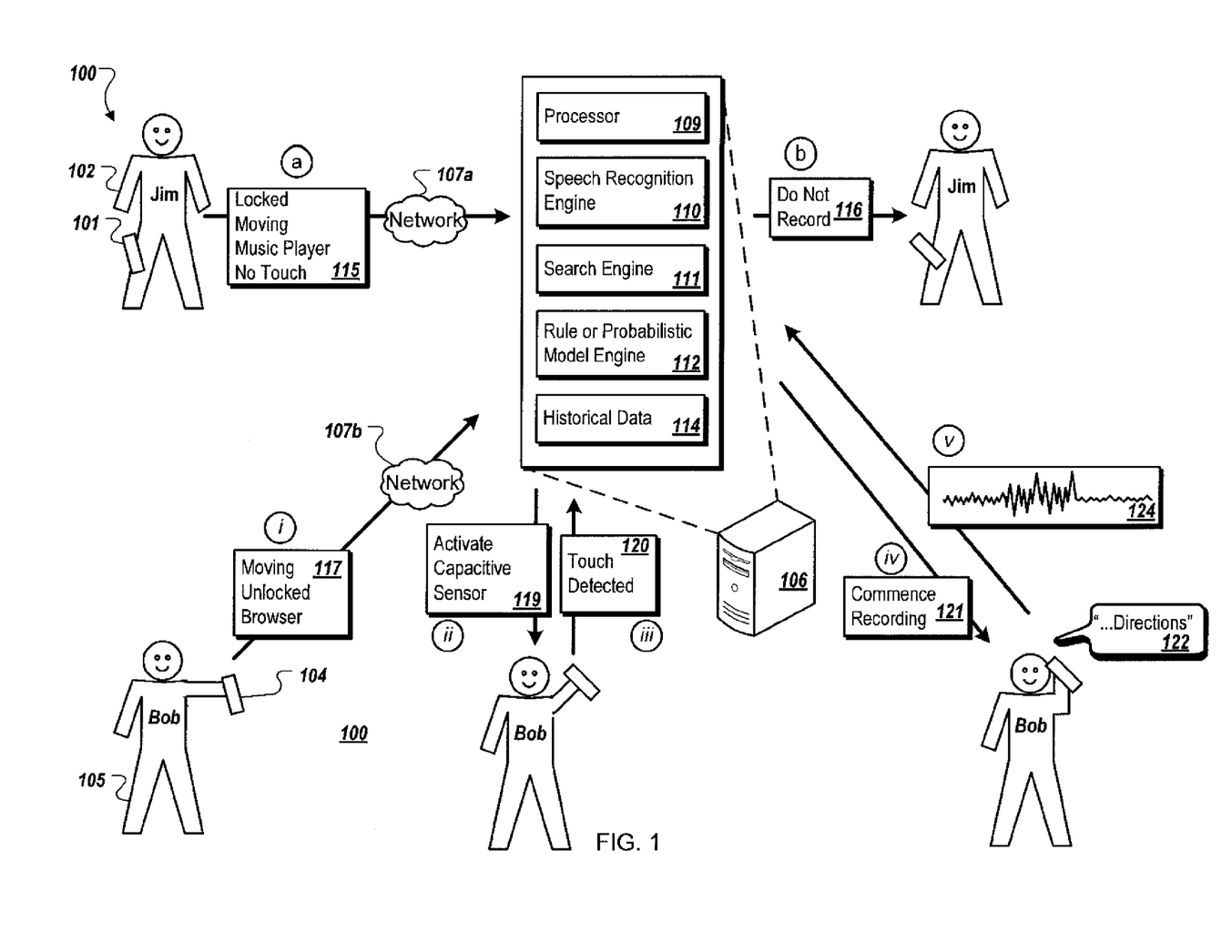
FIGS. 1 and 3 are diagrams that demonstrate predictive pre-recording of audio for voice input.

FIG. 1 is a diagram that demonstrates predictive pre-recording of audio for voice input. In particular, FIG. 1 illustrates a system 100 that includes a mobile client communication device 101 belonging to a user 102 ("Jim"), a mobile client communication device 104 belonging to a user 105 ("Bob"), and a server 106. The mobile devices 101 and 104 are connected to the server 106 over one or more network 107 (illustrated as network 107a and 107b). The network 107 is a private network, such as an intranet or cellular telephone network, a public network, such as the Internet, or some combination thereof. FIG. 1 also illustrates a first example interaction between the device 101 and the server 106, in time-sequenced states "a" and "b," and a second example interaction between the device 104 and the server 106 in time-sequenced states "i" through "v."

Initially, as used by this specification, a "term" (or "query term") includes one or more whole or partial words, characters, or strings of characters; a "search query" includes the one or more query terms that the user submits to a search engine when the user requests the search engine to execute a search. A term may be typed by the user using a keyboard or, in the case of voice queries, the user may speak or otherwise provide voice input that is transcribed by a speech recognition engine before it is submitted to the search engine.

Among other things, a "result" (or a "search result") of the search includes a Uniform Resource Identifier (URI) that references a resource that the search engine determines to the be responsive to the search query. The search result may include other things, such as a title, preview image, user rating, map or directions, description of the corresponding resource, or a snippet of text that has been automatically or manually extracted from or otherwise associated with the corresponding resource.

In the illustrated example, the mobile client communication devices 101 and 104 are mobile telephones that include functionality that allows the respective users to initiate voice input. For example, the mobile devices 101 and 104 may execute applications that display a search box and that, upon detecting the selection of a physical "voice search" button or user interface "voice search" control, record audio through a microphone, generate an audio signal, and submit the audio signal to a speech recognition engine or a search engine. In other examples, the mobile client communication devices 101 and 104 are tablet computers, laptop computers, personal digital assistants (PDA), mobile audio players, Global Positioning System (GPS) receivers, or other devices that, among other elements, include one or more processors and one or more microphones.

The server 106, which may be implemented as one or more computing devices, includes one or more processors 109, a speech recognition engine 110 that processes voice queries for a search engine 111, and a rule or probabilistic model engine 112 (e.g., a rule engine, a probabilistic model engine, or any combination thereof) that applies rules or probabilistic models to input data to infer (or otherwise determine) whether one or more functionalities of a mobile client communication device should be invoked. The inference may indicate, for example, that there is a probability above a predefined threshold that the user is about to begin speaking.

The server 106 also stores historical data 114 relating to the devices 101 and 104 and/or other mobile client communication devices. For example, the historical data 114 may store past input data that has previously been submitted by users (e.g., users 102 or 105, or other users), and an indication of whether the past input data resulted in an inference that the users were likely to initiate voice input.

In implementations where the users opt to provide access to such information, records in the historical data 114 can be referenced by a user identification, such as the name, telephone number or internet protocol (IP) address of the user 102 or 105. For example, the behavior of a specific user can be tracked to determine when that user may be likely to initiate voice input. The historical data 114, in some implementations, includes records tracking the activities of a group or cluster of users to determine typical user scenarios which are indicative of voice input initiation. Rules or models can be developed from these scenarios, and can be applied to input data when determining whether or not an individual user is likely to initiate voice input.

Although the speech recognition engine 110, the search engine 111, and the rule or probabilistic model engine 112 are illustrated as components of the server 106, in other example implementations these engines are implemented, in whole or part, on another device, such as on the mobile device 101 or the mobile device 104. For instance, the rule or probabilistic model engine 112 may be run on the mobile device 101 or on the mobile device 104, to reduce battery consumption by minimizing network communications. The software on the mobile device 101 or the mobile device 104 can incorporate a static pre-built probabilistic model, or the probabilistic model can be occasionally updated by the server and uploaded to the mobile device 101 or the mobile device 104. The mobile device 101 or the mobile device 104 may also store and send training data periodically to the server to allow the server to update the probabilistic model.

FIG. 1 illustrates a first example interaction that occurs between the device 101 and the server 106, in time-sequenced states "a" and "b." In this first example interaction, the user 102 ("Jim") has the mobile device 101 in his pocket, and is listening to music using a music player application that is executing on the mobile device 101. In this first example interaction, the user 102 does not intend to initiate voice input.

In state "a," data 115 relating to the mobile device 101, referred to by this specification as "input data," is obtained, generated, selected, updated, received, or otherwise established. For instance, the input data 115 may be device state data that references a state of the mobile device 101 and/or raw or processed sensor data that is sensed by one or more sensors of the mobile device 101. In FIG. 1, the input data 115 includes device state data that references that the mobile device 101 is operating in a "locked" software state and is running a music player application, and sensor data that references that the mobile device 101 is moving (i.e., as sensed by an accelerometer) and is not being touched (i.e., as sensed by a capacitive sensor or a touch sensor).

Input data may be continuously obtained or updated, or it may be obtained or updated based on the receipt of a signal (i.e., a signal from the server 106 to begin establishing input data). In another example, input data may be obtained based on the occurrence of an event (i.e., the passage of time, or upon detecting that the mobile device 101 has been powered on, or has begun moving).

The input data 115 that is established for the mobile device 101 in state "a" may include all of the device state data and sensor data that is available at a particular time, or some subset of the available device state data and sensor data. Where the device includes sensors that are not activated or that are not generating data at a particular time, for example to save power, obtaining sensor data may include collecting data from the sensors that are activated or some subset thereof, and/or activating de-activated sensors and collecting data from them. Once obtained, the input data 115 is communicated over the network 107a to the server 106.

Using the rule or probabilistic model engine 112, the server 106 applies a rule or a probabilistic model to the input data 115, respectively, to infer whether the user is or is not likely to initiate voice input. The outcome of applying the rule or probabilistic model to the input data 115 may indicate that the user is likely to initiate voice input (i.e., a likelihood satisfies a predefined or dynamically defined threshold), that the user is unlikely to initiate voice input (i.e., a likelihood score does not satisfy a predefined or dynamically defined threshold), or that it is unclear whether the user is likely to initiate voice input (i.e., a likelihood score cannot be determined based on a given set of inputs, or a likelihood score falls between an upper and lower threshold).

In this first example interaction, the rule or probabilistic model 112 determines that, because the user 102 is not touching the mobile device 101, because the music player is executing, because the mobile device 101 is moving, because the mobile device 101 is in a locked state, or based on any weighted or unweighted combination of the device state data and sensor data, the user is not likely to initiate voice input. The input data and data referencing an outcome of the inference are stored on the server 106 as historical data 114, for use in generating or altering rules or training models that are used by the rule or probabilistic model engine 112.

Based on this inference, the server 106 communicates a message 116 to the mobile device 101 in state "b," indicating to the mobile device 101 that the user is not likely to initiate voice input, and/or that predictive pre-recording of audio should not occur. In some implementations, the message 116 can include an acknowledgement of the data received from the mobile device 101, or the server 106 may not respond in any manner if the server has determined that the user is not likely to initiate voice input. The collection of input data and the inference of whether the user intends to initiate voice input may occur once, may repeat a certain number of times or on a certain interval, or may repeat until the occurrence of a predetermined event (i.e., until a battery drains, or a mobile device ceases moving).

If the user 102 did intend to initiate voice input following state "b," (e.g., if the inference was a "false negative"), additional movements, touches or state changes of the mobile device 101 may be detected, and data indicative of these additional movements, touches, or state changes may be used by the rule or probabilistic model engine 112 to infer that the user 102 does actually intend to initiate the voice input, or to adjust a rule or train a model to better align with the user's intentions. Because the user may have to initiate the voice input manually despite the predictive pre-recording capability, the user interface may include a button or control for explicitly invoking voice input. Once predictive pre-recording has begin, however, this button or control can be removed or grayed out to temporarily disable the manual initiation capability. Alternatively, the selection of the control may cause the pre-recording to cease, or may disable the predictive pre-recording functionality.

FIG. 1 also illustrates a second example interaction that occurs between the device 104 and the server 106, in time-sequenced states "i" through "v." In this second example interaction, the user 105 ("Bob") is in the process of raising his mobile device 104 to his ear and mouth, to initiate voice input.

In state "i," input data 117 relating to the mobile device 104 is established. For instance, the input data 117 includes device state data that that references that a browser application is running on the mobile device 104 and that references that the mobile device 104 is operating in an "unlocked" software state. The input data 117 also includes sensor data that references that the mobile device 104 is moving (i.e. as sensed by an accelerometer). The input data 117 may be continuously obtained, it may be obtained based on the receipt of a signal, or it may be obtained based on the occurrence of an event. The input data 117 is communicated over the network 107b to the server 106.

Using the rule or probabilistic model engine 112, the server 106 applies a rule or a probabilistic model to the input data 117, respectively, to infer whether the user is or is not likely to initiate voice input. In this second example interaction, the rule or probabilistic model may determine, because mobile device 104 is moving, because the mobile device 104 is operating in an unlocked state, or based on any weighted or unweighted combination of the device state data and sensor data, that it is unclear whether the user is likely to initiate voice input.

In some implementations, in addition to the input data 117, the server 106 considers external data when determining whether the user is likely to initiate voice input. For example, the server 106 can compare the time of day or the day of week in to the typical behavior of the user 105 (e.g., as tracked within the historical data 114).

To establish this likelihood more definitively, the rule or probabilistic model engine 112 may then identify unutilized or underutilized functionalities of the mobile device 104, and may communicate a message to invoke a particular functionality of the mobile device 104 that may aid the rule or probabilistic model engine 112 in inferring whether the user is likely to initiate voice input. For example, the rule or probabilistic model engine 112 may determine that the mobile device 104 includes an capacitive sensor and may further determine, based on the lack of capacitive sensor data in the input data 117, that the capacitive sensor is not activated or that the capacitive sensor data is not being obtained as input data. If the rule or probabilistic model engine 112 determines that no additional functionalities of the mobile device 104 are available, the rule or probabilistic model engine 112 may generate a "best guess" inference with whatever input data is available.

Based on inferring that it is unclear whether it is likely that the user 105 will initiate voice input and that the mobile device 104 has the capability to generate capacitive sensor data that might aid the accuracy of such an inference, the server 106 communicates a message 119 to the mobile device 104 to activate the capacitive sensor. Based on receiving the message 119, the mobile device 104 activates the capacitive sensor, establishes the capacitive sensor data ("touch detected") as updated input data, and communicates a message 120 that includes the capacitive sensor data to the server 106, in state "iii". The message 120 may include other data as well, including the input data 117, or updated device state data or sensor data.

When the message 120 is received, the server 106 applies a same or different rule or probabilistic model to the input data, to infer whether the user is or is not likely, or remains likely or not likely, to initiate voice input. For instance, based on the receipt of the capacitive sensor data, the rule or probabilistic model engine 112 may select and use a rule or probabilistic mode that utilizes capacitive sensor data as input data.

Because the capacitive sensor data indicates that a touch is detected, or based on any weighted or unweighted combination of the device state data and sensor data, including the capacitive sensor data, the rule or probabilistic model 112 determines that the user is likely to initiate voice input. The input data and data referencing an output of the inference are stored on the server 106 as historical data 114, for use in generating or altering rules or training models that are used by the rule or probabilistic model engine 112.

Based on this inference, the server 106 communicates a message 121 to the mobile device 104 in state "iv", indicating to the mobile device 104 that the user is likely to initiate voice input, and/or that predictive pre-recording of audio should commence. The collection of input data and the inference of whether the user intends to initiate voice input may occur once, may repeat a certain number of times or on a certain interval, may repeat until the occurrence of a predetermined event, or may repeat until the Nth time that it is determined that the user is likely to initiate a user input.

The mobile device 104 processes the message 121 and, in response, initiates predictive pre-recording of audio. Predictive pre-recording of audio may occur, for example, by initiating audio recording functionality of the mobile device 104 which records utterances spoken by the user 105, and background audio that occurs before, during or after the utterances are spoken. In this example, predictive pre-recording of audio causes the mobile device 104 to record the utterance 122 "Directions" spoken by the user as voice input, as well as a short (e.g., two seconds) portion of background audio that occurs before the user speaks the utterance 122.

The utterance 122 and portion of the background audio are converted by the mobile device 104 into an audio signal 124, which is communicated from the mobile device 104 to the server 106. In addition to the audio signal 124, other information may be communicated to the server 106, such as candidate transcriptions of the audio signal 124 generated by the mobile device 104, or data that indicates a duration of the background audio recording that is recorded before the user begins speaking.

In some implementations, the mobile device 104 additionally communicates information that may provide the speech recognition engine 110 with context associated with the audio signal 124. For example, the mobile device 104 can provide the contents of a browser or a URI of the contents of the browser (e.g., used to determine the most common terms, subject heading, or other content information), the location of the user (e.g., as determined using a built-in navigational sensor), or an estimated velocity of the user (e.g., whether the user is in the car, on foot, etc.).

The server uses the speech recognition engine 110 to generate one or more transcriptions of the audio signal 124, and uses the search engine 111 to identify resources that are relevant to the transcriptions. In other implementations, all or part of the functions performed by the speech recognition engine 110, the search engine 111, or the rule or probabilistic model engine 112 may be performed by the mobile device 104.

As exemplified above, the system 100 addresses at least three advantages over systems that require voice inputs to be explicitly initiated by the user, for example by requiring users to initiate voice input through the press of a button. With regard to the first advantage, speech recognition is used to transcribe utterances that may have been input in a wide variety of noisy environments, such as when the user is in a crowded room (e.g., a cafeteria), walking down the street, or in the presence of a radio or television. To filter this noise, some noise reduction algorithms require a sample of audio from the environment, without the user's speech. By predictively pre-recording audio before the use initiates the voice input (e.g., before the user presses a button), such a background recording becomes available for use by the noise reduction algorithm, thereby improving recognition accuracy.

With regard to the second advantage, users are often imprecise when initiating voice input, for example by pressing a button after they have already begun speaking or by releasing a button before they have finished speaking. Predictive pre-recording of audio better ensures that the beginning of voice input is not lost, and that the entirety of the user's utterance is recorded and transcribed, again improving recognition accuracy.

With regard to the third advantage, some mobile devices exhibit a significant delay between the time when the voice input is explicitly initiated by the user, and the time when the audio subsystem is initiated and the actual recording of the audio commences. By predictively pre-recording audio, recognition accuracy is improved because the effect of this delay may be addressed and overcome.

The system 100 also provides an additional advantage over systems that continuously record to capture audio before the user initiates input. Specifically, the system 100 does not require the mobile devices 101 and 104 to continuously run a microphone preamplifier, analog-to-digital converter (ADC), and processor circuitry that consumes battery power and shortens the battery life of the mobile devices. Accordingly, in addition to improved recognition accuracy, the system 100 provides for prolonged battery life of the mobile devices 101 and 104, and an enhanced overall user experience.

Figure 2:
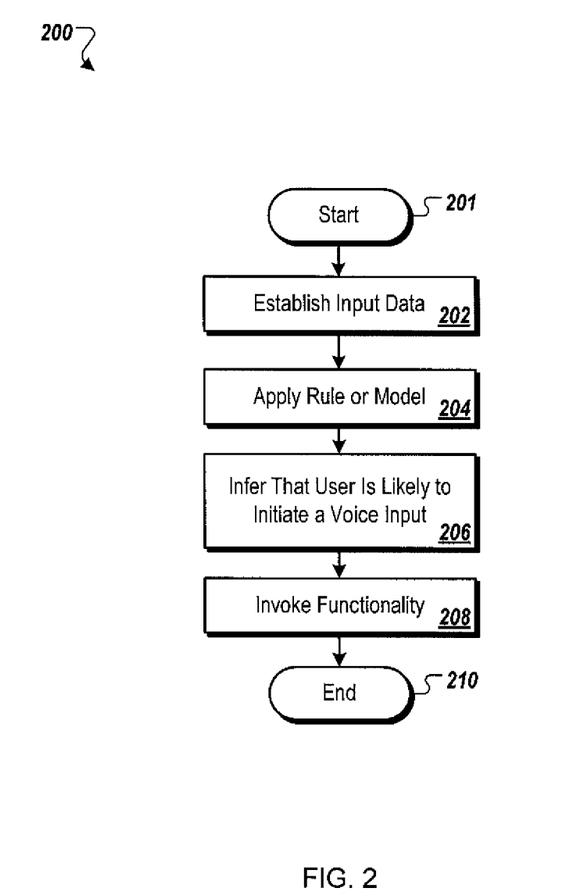
FIG. 2 is a flowchart of an example process.

FIG. 2 illustrates an exemplary process 200. Briefly, the process 200 includes establishing, as input data, data that references a state of a mobile device and data that is sensed by one or more sensors of the mobile device, applying a rule or a probabilistic model to the input data, inferring, based on applying the rule or the probabilistic model to the input data, that the user is likely to initiate voice input, and invoking one or more functionalities of the mobile device in response to inferring that the user is likely to initiate voice input.

In more detail, when the process 200 begins (201), data that references a state of a mobile device and data that is sensed by one or more sensors of the mobile device are established as input data (202). Input data may be continuously obtained (e.g., received or generated), or it may be obtained based on the receipt of a signal from a server to begin obtaining input data. In another example, input data may be obtained based on the occurrence of an event, such as the passage of time, or upon detecting that a mobile device has been powered on or has begun moving.

The data that references the state of the mobile device and the data that is sensed by the sensors of the mobile device may include raw data and/or processed data. For example, the data may include a sensor reading (e.g., a value output by an accelerometer), or a meaningful interpretation of the value (e.g., a computer-generated, textual description of what the value indicates or means). Furthermore, the data that references the state of the mobile device may include data that references a current state and/or a recent state, and the data that is sensed by the sensors may include current or recent data.

Figure 3:
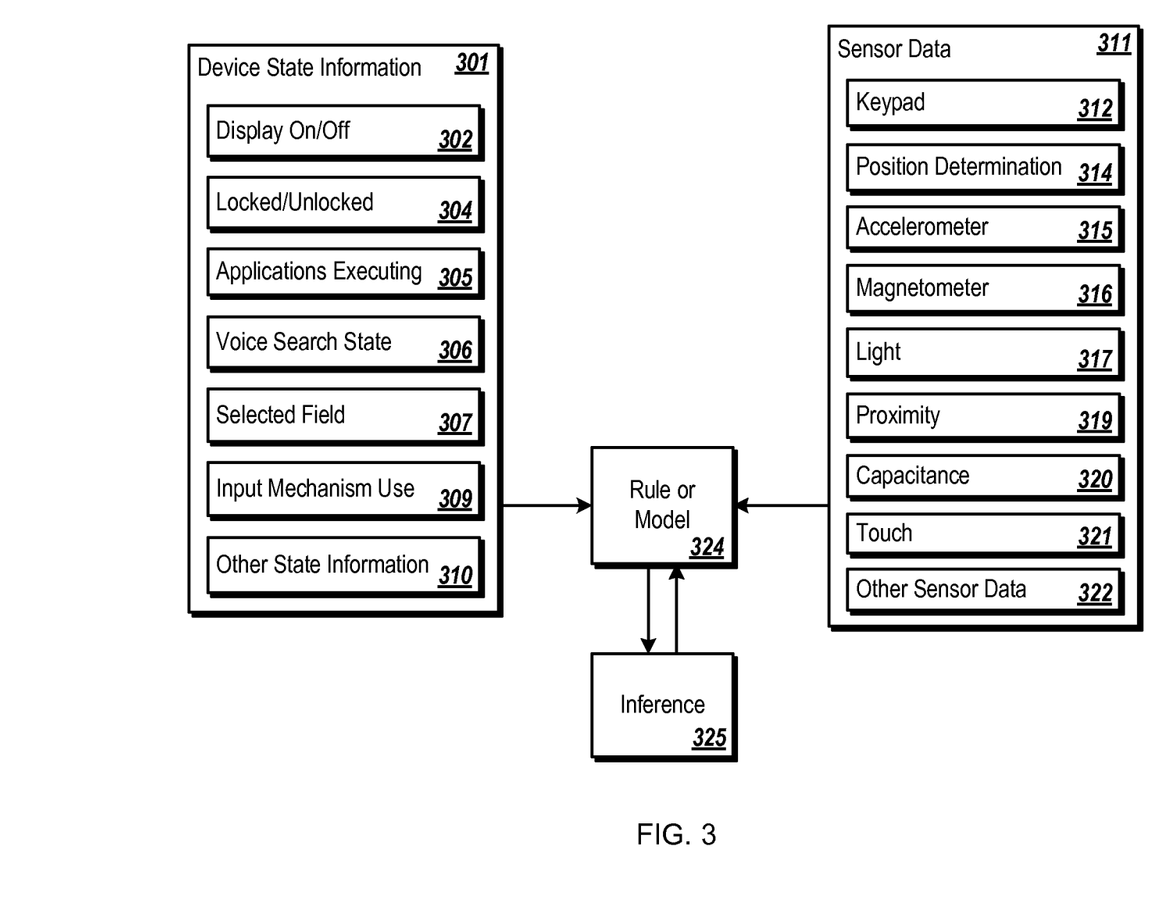

Referring ahead briefly to FIG. 3, the data that references the state of the mobile device (i.e., data 301) may include data 302 that references whether a display of the mobile device is turned on or turned off, or data 304 that references whether the mobile device is in operating in a locked mode or in an unlocked mode. Additionally or alternatively, the data may include data 305 that references one or more applications that are executing on the mobile device, data 306 that references whether a voice search application is executing on the mobile device, data 307 that references whether a field selected by a user of the mobile device is enabled for voice text entry, and/or data 309 that references whether a user of the mobile device is operating an input mechanism of the mobile device (e.g., typing on a keyboard or operating a mouse or trackball). In some implementations, if data 305 references two or more applications executing on the mobile device, the data can include an indication of which application is currently active, or on top, in the display area of the mobile device. The device state data may include any other data 310 that references one or more states of a mobile device. Using a rule or model 324, the device state data 301 may be used by a rule engine or probabilistic model engine to determine whether a user has activated or is activating a software state that is indicative of a forthcoming voice input, and to provide an inference 325 based on this determination.

Furthermore, the data that is sensed by one or more sensors of the mobile device (i.e., data 311) may include data 312 that is sensed by a keypad sensor of the mobile device (i.e., has a physical 'Voice Search' button been pressed), data 314 that is sensed by a position determination sensor (e.g., is the user away from home, moving, or otherwise in transit, as determined by a GPS, inertial navigation, dead reckoning, or cellular network or Wi-Fi triangulation module) of the mobile device, data 315 that is sensed by an accelerometer of the mobile device, data 316 that is sensed by a magnetometer of the mobile device (i.e., device orientation relative to the ground), data 317 that is sensed by a light sensor of the mobile device (i.e., is the device in the user's pocket), data 319 that is sensed by a proximity sensor of the mobile device, data 320 that is sensed by a capacitive sensor of the mobile device, data 321 that is sensed by a touch sensor of the mobile device (i.e., is the user holding the mobile device), and/or data 322 that is obtained from any other sensor. Using a rule or model 324, the sensor data may be used by a rule engine or probabilistic model engine to determine that the device is in a physical position or orientation that is indicative of a forthcoming voice input, and to provide an inference 325 based on this determination.

Returning to FIG. 2, rule or a probabilistic model is applied to the input data (204) in order to generate an inference of whether the user is likely to initiate voice input. In a rule-based approach, a rule can be applied to the input data to output an indication of whether the user is likely to initiate voice input, where different combinations of sensor data and device state data will provide different outcomes. For instance, a mobile device may have a physical search button that typically requires a two-second depression to initiate a voice search. A rule may provide that, when a capacitive sensor indicates that the mobile device is being held and the device is in an unlocked state, the predictive pre-recording of audio can commence as soon as the physical search button is depressed, rather than waiting until the two second period of time elapses.

In another example, a rule may provide that predictive pre-recording of audio may commence when the screen is on and when the mobile device is in a condition where voice search can be triggered with one button press or one gesture, for example when the voice search box is visible, or when voice input Input Method Editor (IME) is visible on the screen. If a touch sensor is available, the touch sensor data can be used to detect that the user is holding the device, in which case recording to the rolling audio buffer can be initiated.

Any or all of the data types described above may be used as inputs to a probabilistic model as well or instead. Instead of defining a specific outcome for each possible combination of input data, however, a probabilistic model can generate scores for each item of input data, and can infer that the user is likely to initiate voice input, and can initiate predictive pre-recording audio using these scores, when the conditions set forth in Equation (1) are satisfied:

$$P(\text{voice input}|\text{device state data, sensor data}) > \text{threshold} \quad (1)$$

The probabilistic model can use a naive Bayes approach, logistic regression, support vector machines (SVMs), Gaussian Mixture Models or Bayesian Networks. These models can be trained based on input data and concomitant inferences (e.g., inference 325) collected from mobile devices used by a large number of users. Additionally, input data and concomitant inferences can be collected from an individual user's device, and can be used by the software on the device to adjust the weights in the probabilistic model to reflect the user's actual behavior.

In one example, when it is observed that the user is much more likely to initiate voice input when he holds the device in a specific orientation, the weight in the model for that orientation can be increased. In this way, both false positives (e.g., an inference that the user is likely to initiate voice input, however the user never spoke and the speech recognition engine returned an empty recognition result) and false negatives (e.g., an inference that the user is not likely to initiate voice input, however the user began speaking and the mobile device did not start recording pre-input audio) can be used as training examples to refine the classifier.

Based on applying the rule or the probabilistic model to the input data, it is inferred that the user is likely to initiate voice input (206). Inferring that the user is likely to initiate voice input may include determining that the score associated with the input data satisfies a predefined threshold.

One or more functionalities of the mobile device may be invoked in response to inferring that the user is likely to initiate voice input (208), thereby ending the process 200 (210). For example, invoking the functionalities of the mobile device may include commencing a background audio recording of audio prior to a user's button press. The background audio may be used as input to the speech recognition engine, to estimate noise models for noise suppression, and/or estimate noise models and/or levels for speech endpoint detection.

Instead of or in addition to commencing predictive pre-recording of audio, invoking the functionalities of the mobile device may include activating a sensor of the mobile device in response to inferring that the user is likely to initiate voice input, or in response to inferring that it is unclear whether the user is likely to initiate a user input. For example, the rule or probabilistic model engine may determine that the mobile device includes a sensor that may help infer more definitively whether the user is likely to initiate voice input, and may send a signal to the mobile device to activate the sensor if sensor data for the sensor is not included as part of the input data.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification can be implemented in digital electronic circuitry, or in computer software, firmware, or hardware, including the structures disclosed in this specification and their structural equivalents, or in combinations of one or more of them. Embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims can be performed in a different order and still achieve desirable results.

What is claimed is:

1. A system comprising:
one or more computers; and
a computer-readable medium coupled to the one or more computers having instructions stored thereon which, when executed by the one or more computers, cause the one or more computers to perform operations comprising:
obtaining sensor data from one or more sensors of a mobile device, while the mobile device is operating in a mode in which the one or more sensors of the mobile device are enabled, and audio recording functionality and additional functionality of the mobile device are both disabled;
determining that a user of the mobile device is interacting with the mobile device based on the sensor data, while the mobile device is operating in the mode in which the one or more sensors of the mobile device are enabled, and the audio recording functionality and the additional functionality of the mobile device are both disabled;
placing the mobile device in a mode in which the one or more sensors of the mobile device and the audio recording functionality of the mobile device are both enabled, and the additional functionality of the mobile device is disabled, in response to determining that the user of the mobile device is interacting with the mobile device;
detecting a voice input while the mobile device is operating in the mode in which the one or more sensors of the mobile device and the audio recording functionality of the mobile device are both enabled, and the additional functionality of the mobile device is disabled; and
determining whether to place the mobile device in a mode in which the one or more sensors of the mobile device, the audio recording functionality, and the additional functionality of the mobile device are all enabled, in response to detecting the voice input,
wherein the mobile device is operating in a mode in which the additional functionality of the mobile device is disabled when at least one of (i) a display of the mobile device is powered off, (ii) the mobile device is operating in a locked mode, and (iii) no applications are executing on the mobile device.

2. The system of claim 1, wherein obtaining the sensor data from the one or more sensors of the mobile device, while the mobile device is operating in the mode in which the one or more sensors of the mobile device are enabled, and the audio recording functionality and the additional functionality of the mobile device are both disabled comprises continuously obtaining the sensor data from the one or more sensors of the mobile device, while the mobile device is operating in the mode in which the one or more sensors of the mobile device are enabled, and the audio recording functionality and the additional functionality of the mobile device are both disabled.

3. The system of claim 1, wherein the sensor data comprises data that is sensed by a keypad sensor of the mobile device, data that is sensed by a position determination sensor of the mobile device, data that is sensed by an accelerometer of the mobile device, data that is sensed by a magnetometer of the mobile device, data that is sensed by a light sensor of the mobile device, data that is sensed by a proximity sensor of the mobile device, data that is sensed by a capacitive sensor of the mobile device, or data that is sensed by a touch sensor of the mobile device.

4. The system of claim 1, wherein the operations further comprise:
obtaining state data that references a state of the mobile device; and
determining whether the mobile device is operating in a mode in which the additional functionality of the mobile device is disabled based on the state data.

5. The system of claim 4, wherein the state data comprises data that references whether a display of the mobile device is turned on or turned off, data that references whether the mobile device is operating in a locked mode or in an unlocked mode, data that references whether an application is executing on the mobile device, or data that references whether the user is operating an input mechanism of the mobile device.

6. The system of claim 1, wherein determining that the user of the mobile device is interacting with the mobile device based on the sensor data comprises determining that the user is holding and moving the mobile device based on the sensor data.

7. The system of claim 1, wherein determining that the user of the mobile device is interacting with the mobile device based on the sensor data comprises:
applying a rule or a probabilistic model to the sensor data; and
inferring that the user of the mobile device is interacting with the mobile device based on applying the rule or the probabilistic model to the sensor data.

8. The system of claim 7, wherein the operations further comprise generating the rule or training the probabilistic model using historical sensor data.

9. The system of claim 8, wherein generating the rule or training the probabilistic model using historical sensor data comprises:
receiving historical input data collected by other mobile devices; and
training the probabilistic model using the historical input data associated with the mobile device and the historical input data collected by the other mobile devices.

10. The system of claim 1, wherein determining that the user of the mobile device is interacting with the mobile device based on the sensor data comprises:
determining a score associated with the sensor data; and
determining that the score associated with the sensor data satisfies a predefined threshold.

11. The system of claim 1, wherein placing the mobile device in a mode in which one or more sensors of the mobile device and the audio recording functionality of the mobile device are both enabled, and the additional functionality of the mobile device is disabled, in response to determining that the user of the mobile device is interacting with the mobile device comprises commencing an audio recording in response to determining that the user of the mobile device is interacting with the mobile device.

12. The system of claim 1, wherein determining whether to place the mobile device in a mode in which the one or more sensors of the mobile device, the audio recording functionality, and the additional functionality of the mobile device are all enabled comprises determining whether to operate the mobile device in an unlocked mode.

13. The system of claim 1, wherein determining whether to place the mobile device in a mode in which the one or more sensors of the mobile device, the audio recording functionality, and the additional functionality of the mobile device are all enabled comprises determining whether to invoke an application on the mobile device.

14. The system of claim 1, wherein determining whether to place the mobile device in a mode in which the one or more sensors of the mobile device, the audio recording functionality, and the additional functionality of the mobile device are all enabled comprises determining whether to invoke a functionality of the mobile device associated with the voice input.

15. A system comprising:
one or more computers; and
a computer-readable medium coupled to the one or more computers having instructions stored thereon which, when executed by the one or more computers, cause the one or more computers to perform operations comprising:
obtaining sensor data from one or more sensors of a mobile device, while the mobile device is operating in a mode in which the one or more sensors of the mobile device are enabled, and audio recording functionality and additional functionality of the mobile device are both disabled;
determining that a user of the mobile device is interacting with the mobile device based on the sensor data, while the mobile device is operating in the mode in which the one or more sensors of the mobile device are enabled, and the audio recording functionality and the additional functionality of the mobile device are both disabled;
placing the mobile device in a mode in which the one or more sensors of the mobile device and the audio recording functionality of the mobile device are both enabled, and the additional functionality of the mobile device is disabled, in response to determining that the user of the mobile device is interacting with the mobile device;
detecting a voice input while the mobile device is operating in the mode in which the one or more sensors of the mobile device and the audio recording functionality of the mobile device are both enabled, and the additional functionality of the mobile device is disabled; and
determining whether to place the mobile device in a mode in which the one or more sensors of the mobile device, the audio recording functionality, and the additional functionality of the mobile device are all enabled, in response to detecting the voice input, wherein determining whether to place the mobile device in the mode in which the one or more sensors of the mobile device, the audio recording functionality, and the additional functionality of the mobile device are all enabled comprises determining whether to power on a display of the mobile device.

16. A non-transitory computer storage medium encoded with a computer program, the program comprising instructions that when executed by one or more computers cause the one or more computers to perform operations comprising:
obtaining sensor data from one or more sensors of a mobile device, while the mobile device is operating in a mode in which the one or more sensors of the mobile device are enabled, and audio recording functionality and additional functionality of the mobile device are both disabled;
determining that a user of the mobile device is interacting with the mobile device based on the sensor data, while the mobile device is operating in the mode in which the one or more sensors of the mobile device are enabled, and the audio recording functionality and the additional functionality of the mobile device are both disabled;
placing the mobile device in a mode in which the one or more sensors of the mobile device and the audio recording functionality of the mobile device are both enabled, and the additional functionality of the mobile device is disabled, in response to determining that the user of the mobile device is interacting with the mobile device;
detecting a voice input while the mobile device is operating in the mode in which the one or more sensors of the mobile device and the audio recording functionality of the mobile device are both enabled, and the additional functionality of the mobile device is disabled; and
determining whether to place the mobile device in a mode in which the one or more sensors of the mobile device, the audio recording functionality, and the additional functionality of the mobile device are all enabled, in response to detecting the voice input,
wherein the mobile device is operating in a mode in which the additional functionality of the mobile device is disabled when at least one of (i) a display of the mobile device is powered off, (ii) the mobile device is operating in a locked mode, and (iii) no applications are executing on the mobile device.

17. A computer-implemented method comprising:
obtaining sensor data from one or more sensors of a mobile device, while the mobile device is operating in a mode in which the one or more sensors of the mobile device are enabled, and audio recording functionality and additional functionality of the mobile device are both disabled;
determining that a user of the mobile device is interacting with the mobile device based on the sensor data, while the mobile device is operating in the mode in which the one or more sensors of the mobile device are enabled, and the audio recording functionality and the additional functionality of the mobile device are both disabled;
placing the mobile device in a mode in which the one or more sensors of the mobile device and the audio recording functionality of the mobile device are both enabled, and the additional functionality of the mobile device is disabled, in response to determining that the user of the mobile device is interacting with the mobile device;
detecting a voice input while the mobile device is operating in the mode in which the one or more sensors of the mobile device and the audio recording functionality of the mobile device are both enabled, and the additional functionality of the mobile device is disabled; and
determining whether to place the mobile device in a mode in which the one or more sensors of the mobile device, the audio recording functionality, and the additional functionality of the mobile device are all enabled, in response to detecting the voice input, wherein the mobile device is operating in a mode in which the additional functionality of the mobile device is disabled when at least one of (i) a display of the mobile device is powered off, (ii) the mobile device is operating in a locked mode, and (iii) no applications are executing on the mobile device.

\* \* \* \* \*